US012769134B2

(12) United States Patent
Ronen

(10) Patent No.: US 12,769,134 B2
(45) Date of Patent: Oct. 20, 2026

(54) UNIFORMITY ENHANCEMENT OF A COLOR MIXING COMPACT IMAGE PROJECTOR

(71) Applicant: Lumus Ltd., Ness Ziona (IL)

(72) Inventor: Eitan Ronen, Rechovot (IL)

(73) Assignee: Lumus Ltd., Ness Ziona (IL)

( * ) Notice: Subject to any disclaimer, the term of this patent is extended or adjusted under 35 U.S.C. 154(b) by 203 days.

(21) Appl. No.: 18/836,534

(22) PCT Filed: May 29, 2023

(86) PCT No.: PCT/US2023/067591
§ 371 (c)(1),
(2) Date: Aug. 7, 2024

(87) PCT Pub. No.: WO2023/235687
PCT Pub. Date: Dec. 7, 2023

(65) Prior Publication Data
US 2025/0164790 A1 May 22, 2025

Related U.S. Application Data

(60) Provisional application No. 63/347,595, filed on Jun. 1, 2022.

(51) Int. Cl.
*G02B 27/01* (2006.01)
*G02B 27/09* (2006.01)
(Continued)

(52) U.S. Cl.
CPC ..... *G02B 27/0172* (2013.01); *G02B 27/0972* (2013.01); *G02B 27/14* (2013.01);
(Continued)

(58) Field of Classification Search
CPC ............ G02B 27/0172; G02B 27/0972; G02B 27/14; G02B 27/18; G02B 2027/0112; G02B 2027/0178
See application file for complete search history.

(56) References Cited

U.S. PATENT DOCUMENTS

| | | | |
|---|---|---|---|
| 6,139,166 | A | 10/2000 | Marshall et al. |
| 6,829,095 | B2 | 12/2004 | Amitai |

(Continued)

FOREIGN PATENT DOCUMENTS

| | | | |
|---|---|---|---|
| CN | 112637576 A | 4/2021 |
| WO | 2022070197 | 4/2022 |
| WO | 2023058034 | 4/2023 |

OTHER PUBLICATIONS

International Search Report and Written Opinion issued for corresponding International Patent Application No. PCT/US2023/067591, mailed Nov. 2, 2023.

*Primary Examiner* — Nathanael R Briggs
(74) *Attorney, Agent, or Firm* — Renner, Otto, Boisselle & Sklar, LLP

(57) ABSTRACT

A light projecting system may include a discrete light source matrix for emitting light corresponding to an image. The system may also include a waveguide formed from transparent material and having a coupling-in interface for coupling in the light corresponding to the image into the waveguide, and a coupling-out interface for coupling out the image out of the waveguide. The system may include an inner partially reflective surface and one or more partial lenses for enhancing color uniformity of the light projecting system.

19 Claims, 15 Drawing Sheets

(51) Int. Cl.
*G02B 27/14* (2006.01)
*G02B 27/18* (2006.01)

(52) U.S. Cl.
CPC ...... *G02B 27/18* (2013.01); *G02B 2027/0112* (2013.01); *G02B 2027/0178* (2013.01)

(56) References Cited

U.S. PATENT DOCUMENTS

| | | | | |
|---|---|---|---|---|
| 7,021,777 | B2 | 4/2006 | Amitai | |
| 7,339,742 | B2 | 3/2008 | Amitai et al. | |
| 7,576,916 | B2 | 8/2009 | Amitai | |
| 7,643,214 | B2 | 1/2010 | Amitai | |
| 7,672,055 | B2 | 3/2010 | Amitai | |
| 10,247,870 | B2 | 4/2019 | Chen et al. | |
| 10,437,031 | B2 | 10/2019 | Danziger et al. | |
| 10,437,068 | B2 | 10/2019 | Weng et al. | |
| 10,481,319 | B2 | 11/2019 | Danziger et al. | |
| 10,895,679 | B2 | 1/2021 | Ofir et al. | |
| 11,226,261 | B2 | 1/2022 | Lobachinsky et al. | |
| 11,789,264 | B2 | 10/2023 | Ronen et al. | |
| 12,105,287 | B1 * | 10/2024 | Bhakta | G02B 6/003 |
| 2004/0120647 | A1 | 6/2004 | Sakata et al. | |
| 2011/0199780 | A1 | 8/2011 | Jak et al. | |
| 2015/0277125 | A1 | 10/2015 | Hirano et al. | |
| 2020/0088994 | A1 | 3/2020 | Hajati et al. | |
| 2020/0150332 | A1 * | 5/2020 | Nakamura | G02B 27/145 |
| 2020/0192111 | A1 | 6/2020 | Ishii et al. | |
| 2021/0019514 | A1 | 1/2021 | Moghtadai | |
| 2021/0063733 | A1 * | 3/2021 | Ronen | G02B 6/0055 |
| 2022/0004001 | A1 | 1/2022 | Danziger et al. | |
| 2022/0099975 | A1 * | 3/2022 | Schultz | G02B 27/0172 |
| 2022/0107499 | A1 | 4/2022 | Amitai | |
| 2022/0269077 | A1 | 8/2022 | Adema et al. | |
| 2022/0326513 | A1 | 10/2022 | Yeoh et al. | |
| 2023/0194770 | A1 | 6/2023 | Sharlin et al. | |
| 2023/0384598 | A1 * | 11/2023 | Volkov | G02B 27/0081 |
| 2025/0164790 | A1 | 5/2025 | Ronen | |

* cited by examiner

UNIFORMITY ENHANCEMENT OF A COLOR MIXING COMPACT IMAGE PROJECTOR

This application is a national phase of International Application No. PCT/US2023/067591, filed May 29, 2023, which claims priority to U.S. Provisional Patent Application No. 63/347,595, filed Jun. 1, 2022, each of which is hereby incorporated herein by reference in its entirety.

FIELD OF THE INVENTION

The present invention relates to optical systems and, in particular, it concerns novel techniques for uniformity enhancement of color mixing for discrete light source matrix compact image projectors.

BACKGROUND OF THE INVENTION

Consumer demands for improved human-computer interfaces have led to an increased interest in high-quality image head-mounted displays (HMDs) or near-eye displays, commonly known as smart glasses. These devices can provide virtual reality (VR) or augmented reality (AR) experiences, enhancing the way users interact with digital content and their surrounding environment.

Consumers are seeking better image quality, immersive experiences, and greater comfort when using HMDs. They expect displays with high resolution, vibrant colors, and minimal distortion to create a realistic and enjoyable viewing experience. Additionally, comfort is a crucial factor since users often wear these devices for extended periods. Consumers desire lightweight, sleek designs that are less obtrusive and more convenient to wear in various scenarios. Smaller devices also offer improved portability, making them easier to carry and use in different environments. As such, there is a growing demand for higher performing yet smaller and more compact HMDs.

Compact image projectors are vital components of Head-Mounted Displays (HMDs) as they significantly impact their performance and form factor. One prevalent type of compact image projector is the discrete light source matrix projector, which employs discrete colors, such as RGB, and blends them to try achieving the desired color spectrum. However, conventionally, discrete light source matrix projectors have not achieved optimal color mixing and/or required a relatively larger size to adequately mix the discrete colors before producing the output light. Consequently, there is a demand for maximizing visual quality through optimal color mixing while minimizing the size and weight of compact image projectors.

SUMMARY OF THE INVENTION

The present disclosure discloses techniques that enhance color mixing in a compact image projector system while keeping its size relatively small.

A light projecting system may include a discrete light source matrix for emitting light corresponding to an image. The system may also include a waveguide formed from transparent material and having a coupling-in interface for coupling in the light corresponding to an image into the waveguide, and a coupling-out interface for coupling out an image out of the waveguide. The system may include an inner partially reflective surface and one or more partial lenses for enhancing color uniformity of the light projecting system.

This approach achieves improved color mixing while keeping system size relatively small. This can be advantageous in applications where space constraints or compact system design are important factors.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
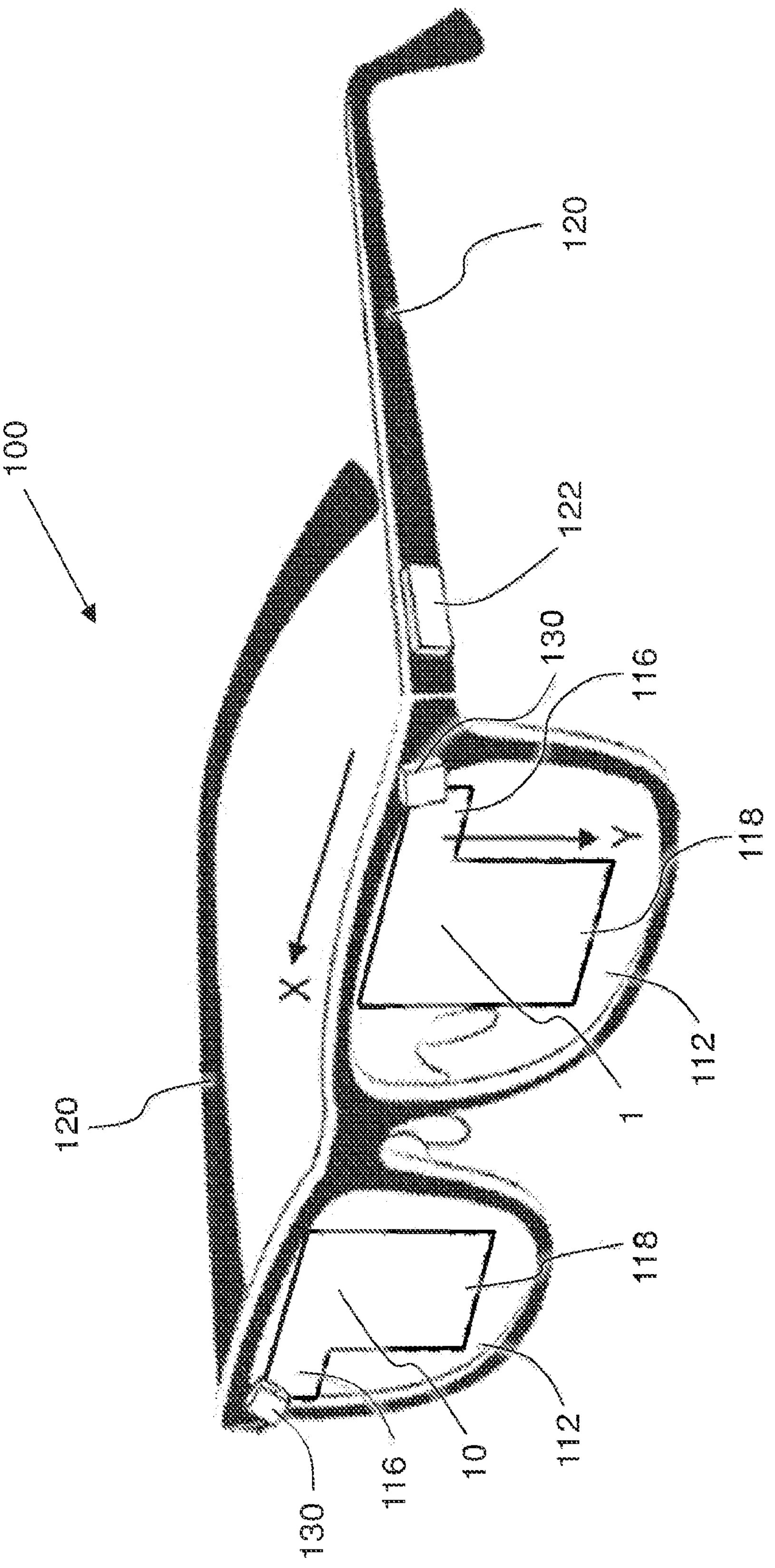
FIG. 1 illustrates a schematic diagram of an exemplary optical system for a near-eye display (NED).

Certain embodiments of the present invention provide a light projecting system and an optical system for achieving optical aperture expansion for the purpose of, for example, head-mounted displays (HMDs) or near-eye displays, commonly known as smart glasses, which may be virtual reality or augmented reality displays. Consumer demands for better and more comfortable human computer interfaces have stimulated demand for better image quality and for smaller devices.

Compact image projectors are vital components of Head-Mounted Displays as they significantly impact their performance and form factor. One prevalent type of compact image projector is the discrete light source matrix projector, which employs discrete colors, such as RGB, and attempts to blend them to achieve the desired color spectrum. However, conventionally, discrete light source matrix projectors have not achieved optimal color mixing and/or required a relatively larger size to adequately mix the discrete colors before producing the output light.

In one embodiment, the insertion of a waveguide between the discrete light source matrix and the output of the compact image projector improves color mixing. The waveguide receives discrete colors (e.g., RGB) emitted by the separate light-emitting elements such as LEDs and guides the discrete colors along its length. At the end surface of the waveguide, the mixed and blended colors combine to produce a visually uniform output.

Conventionally, all else being equal, the longer the waveguide the better the color mixing. Longer waveguides provide better color mixing and, therefore, better image quality. Unfortunately, longer waveguides also increase the overall size of the system.

In one embodiment, the insertion of a partially reflective interface into the waveguide improves color mixing and reduces the required length of the waveguide. This approach takes advantage of the reflective properties of the interface to enhance the interaction between the different colors of light within the waveguide. When light encounters a partially reflective interface, a portion of the light is reflected back into the waveguide, while the rest continues to propagate through the waveguide. By strategically placing this interface within the waveguide, the reflected light can be redirected back into the waveguide, allowing it to interact further with the other colors. The introduction of the partially reflective interface can increase the optical path length for the light within the waveguide, effectively extending the mixing distance. This results in improved color mixing even within a shorter physical length of the waveguide.

The reflective properties of the interface, such as the reflectance and transmittance, can be carefully tuned to achieve the desired level of color mixing. The optimal design parameters of the partially reflective interface, including the material properties and positioning within the waveguide, can be determined through simulations or experimental optimization.

This approach effectively reduces the required length of the waveguide while still achieving effective color mixing. This can be advantageous in applications where space constraints or compact system design are important factors.

In another embodiment, the use of a partial lens at the entrance of the projector's waveguide improves the performance of waveguide color mixing. By covering a portion of the waveguide light input area with a partial lens, light rays emitted from different regions of the discrete color projector may be directed into the waveguide at slightly different angles. This may help enhance the mixing of colors within the waveguide.

A partial lens or lenses may be positioned at the entrance of the waveguide between the discrete light source matrix and the waveguide covering, for example, 50% of the waveguide light input area. The partial lens can have a curved shape or specific surface features that modify the light rays' directionality. The partial lens or lenses redirect the light rays emanating from the covered portion of the waveguide light input area. These redirected rays enter the waveguide at slightly different angles compared to the rays that directly enter the waveguide without passing through the partial lens. By introducing light rays at different angles into the waveguide, the interaction and mixing of colors within the waveguide are improved. The varied angles enable a more efficient overlap and interaction of light waves, leading to enhanced color blending and mixing.

The use of a partial lens or lenses optimizes the coupling of light from the color sequential projector into the waveguide, increasing the efficiency of color mixing over a shorter length. It helps distribute the light from different regions of the projector across the waveguide, encouraging better integration of colors.

Certain embodiments of the present invention provide an optical system for achieving optical aperture expansion for the purpose of a head-up display, and most preferably a near-eye display, which may be a virtual reality display or augmented reality display.

FIG. 1 illustrates an exemplary implementation of a near-eye display device according to the teachings of an embodiment of the present invention, generally designated 100, employing light-guide optical element (LOE) 1. The near-eye display 100 employs a compact image projector (or "POD") 130 optically coupled so as to inject an image into LOE 1 within which the image light is trapped in one dimension by total internal reflection at a set of planar external surfaces ("major surfaces"). The near-eye display device 100 is offered here merely as an example and the inventive techniques disclosed herein are not limited to such devices, devices employing partially reflecting facets, etc.

Optical aperture expansion of light from the POD 130 is achieved within LOE 1 by one or more arrangement for progressively redirecting the image illumination, typically employing a set of partially reflecting surfaces (interchangeably referred to as "facets") that are parallel to each other and inclined obliquely to the direction of propagation of the image light, with each successive facet deflecting a proportion of the image light into a deflected direction. For one-dimensional aperture expansion, the facets also couple-out the image light towards the eye of the user. In some cases, as illustrated here, two-dimensional aperture expansion is achieved by employing a first set of facets in region 116 of LOE 1 to progressively redirect the image illumination within the LOE 1, also trapped/guided by total internal reflection. The deflected image illumination then passes into a second substrate region 118 of the LOE 1, which may be implemented as an adjacent distinct substrate or as a continuation of a single substrate, in which a coupling-out arrangement (for example, a further set of partially reflective facets) progressively couples out a proportion of the image illumination towards the eye of an observer located within a region defined as the eye-motion box (EMB), thereby achieving a second dimension of optical aperture expansion. Similar functionality may be obtained using diffractive optical elements (DOEs) for redirecting and/or coupling-out of image illumination within one or both of regions 116 and 118. Although the following text and figures focus on embedded refractive optical elements, rather than diffractive, this invention applies equally to near eye displays based on diffractive or refractive embedded elements.

The overall device may be implemented separately for each eye and is preferably supported relative to the head of a user with each POD 130 and LOE 1 serving a corresponding eye of the user. In one particularly preferred option as illustrated here, a support arrangement is implemented as a face-mounted set of lenses (e.g., Rx lenses, sunglasses, etc., referred colloquially herein as "eye glasses") with lenses 112 to which the POD 130 and LOE 1 are operably connected and a frame with sides 120 for supporting the device relative to ears of the user. Other forms of support arrangement may also be used, including but not limited to, head bands, visors or devices suspended from helmets.

The near-eye display 100 may include various additional components, typically including a controller 122 for actuating the POD 130, typically employing electrical power from a small onboard battery (not shown) or some other suitable power source. Controller 122 may include all necessary electronic components such as at least one processor or processing circuitry to drive the image projector.

Figure 2:
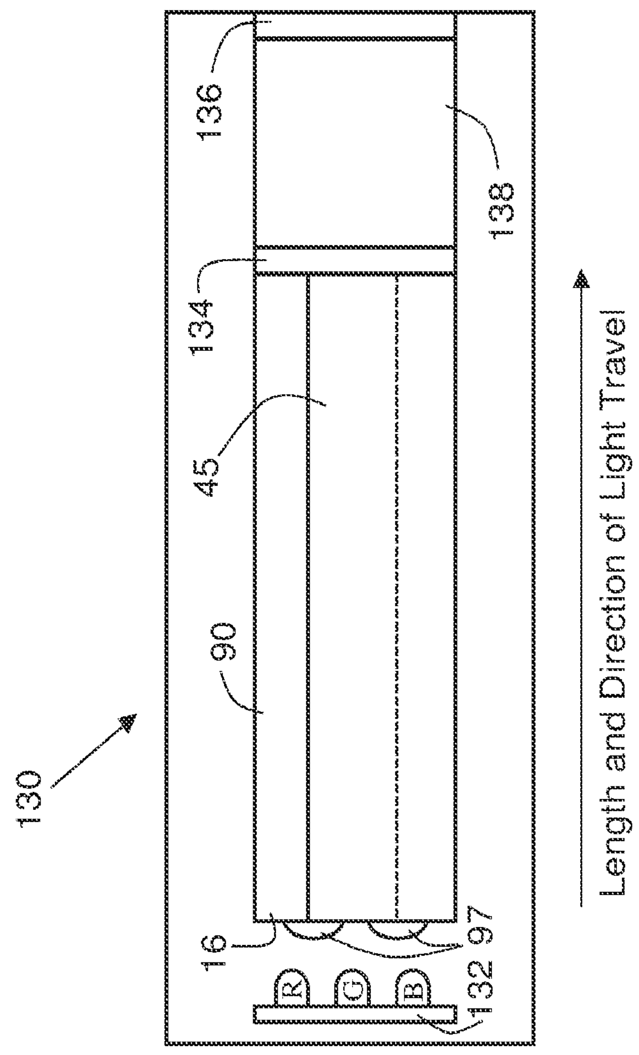
FIG. 2 is a schematic top view of an exemplary POD for the NED of FIG. 1.

FIG. 2 is a simplified schematic top view of an exemplary POD 130. The illustrated elements of the POD 130 are not shown to scale. As described above, the near-eye display 100 employs the compact image projector or POD 130 optically coupled so as to inject an image into the LOE 1. In the embodiments of the present application, the POD 130 includes a discrete light source matrix 132. A discrete light source matrix refers to a configuration where individual light sources are arranged in a grid or matrix pattern. Each light source within the matrix emits light independently and can be controlled individually. In one example, a discrete light source matrix refers to a projection system that utilizes an array of individual light sources, such as Light-Emitting Diodes (LEDs) or laser diodes, arranged in a matrix formation. Each light source corresponds to a specific color channel, usually red (R), green (G), and blue (B) for RGB color reproduction as shown in FIG. 2. By controlling the intensity of each individual light source within the matrix, different colors and intensities can be achieved. This allows for precise color control and the creation of a wide range of colors and shades.

One example of such a compact image projector 130 including a discrete light source matrix 132 is an LCoS system that incorporates LEDs (e.g., RGB) as the light source. In this particular LCoS system, the light path begins with the array 132 of high-intensity LEDs serving as the primary light source.

In the illustrated embodiment of FIG. 2, the POD 130 also includes a waveguide 90 as described in additional detail below in reference to FIG. 7A. The insertion of waveguide 90 in front of the discrete light source matrix 132 improves color mixing. The waveguide 90 may receive discrete colors (e.g., RGB) such as those emitted by the separate light-emitting elements (e.g., LEDs) of the discrete light source matrix 132 and guides the discrete colors along its length.

The LCD (Liquid Crystal Display) panel itself may consist of a surface with an array of tiny filters. Each filter corresponds to a pixel or subpixel in the final image. The modulating element of the LCD panel is a layer of liquid crystal material LCD 134 placed between crossed polarizers.

When the LEDs of the discrete light source matrix 132 emit light, it passes through the waveguide 90 and reaches the LCD panel 134. The liquid crystal layer selectively controls the amount of light that is transmitted. By adjusting the liquid crystal molecules' orientation, the polarizers absorb light, allowing for precise control over the light intensity and color for each pixel.

The modulated light from the LCD panel 134 then passes through a projection lens system 136, which focuses and projects the light forming the final projected image. The lens system 136 may collimate the light by refracting diverging rays to become parallel and focused at infinity. The lens system 136 may also provide any necessary optical corrections to ensure a sharp and accurate projection. In the illustrated embodiment of FIG. 2, the POD 130 also includes a transparent (e.g., glass) spacer 138 between the LCD panel 134 and the lens system 136.

The POD 130 may correspond to projectors other than LCD and/or the discrete light source matrix 132 may correspond to other types of micro displays. For example, many LCoS & DLP projectors employ color sequential technology. These alternative systems may be defined as discrete light source matrix systems and may also benefit from the techniques disclosed herein.

In the illustrated embodiment of FIG. 2, the POD 130 includes an inner partially reflecting surface 45 and partial lenses 97 as described in more detail below.

Figure 2B:
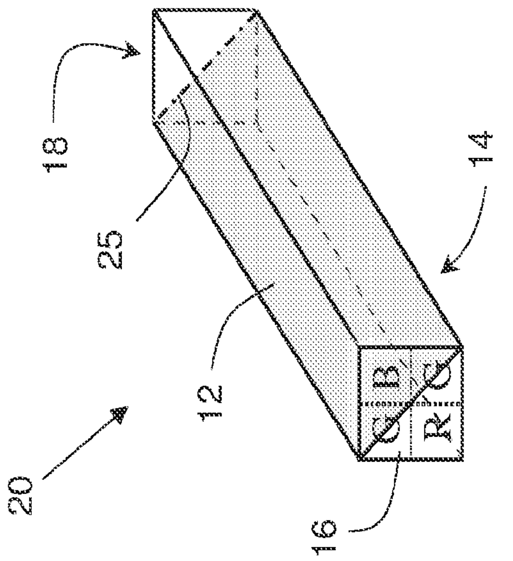
FIG. 2B illustrates an exemplary waveguide that includes an inner partially reflecting surface or interface extending along the length of the waveguide.
Figure 2A:
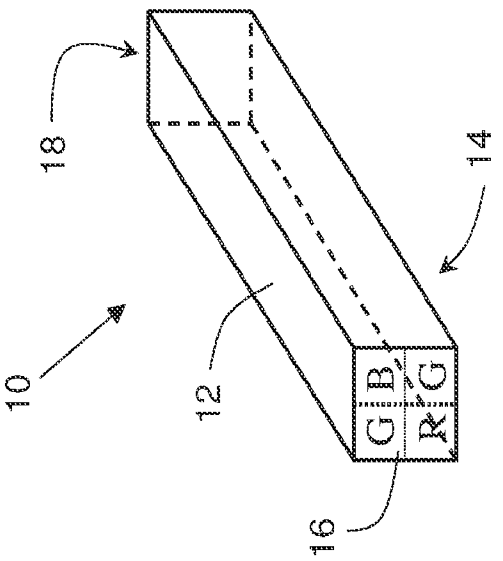
FIG. 2A illustrates a perspective view of a waveguide for the POD of FIG. 2.

FIG. 2A illustrates an exemplary waveguide 10 that may form part of a POD 130, similar to the waveguide 90 of FIG. 2. The waveguide 10 may be formed from transparent material and have at least two major external surfaces 12, 14 for supporting propagation of light along the length of the waveguide 10. The waveguide 10 also has a coupling-in interface 16 for coupling in the image into the waveguide 10. In the example of FIG. 2A, waveguide 10 has a square cross-section of 2×2 mm as an example.

In the illustrated embodiment of FIG. 2A, the discrete light source matrix 132 of the POD 130 of FIG. 2 corresponds to a quad 2×2 LED array. As an example, the entrance size to the waveguide is 2×2 mm where each discrete led is 1×1 mm. Light from array 132 is introduced into the waveguide 10 through the coupling-in interface 16 resulting in the illustrated coupling-in pattern in the order GB:RG (first row: Green, Blue; Second row: Red, Green).

Figure 2C:
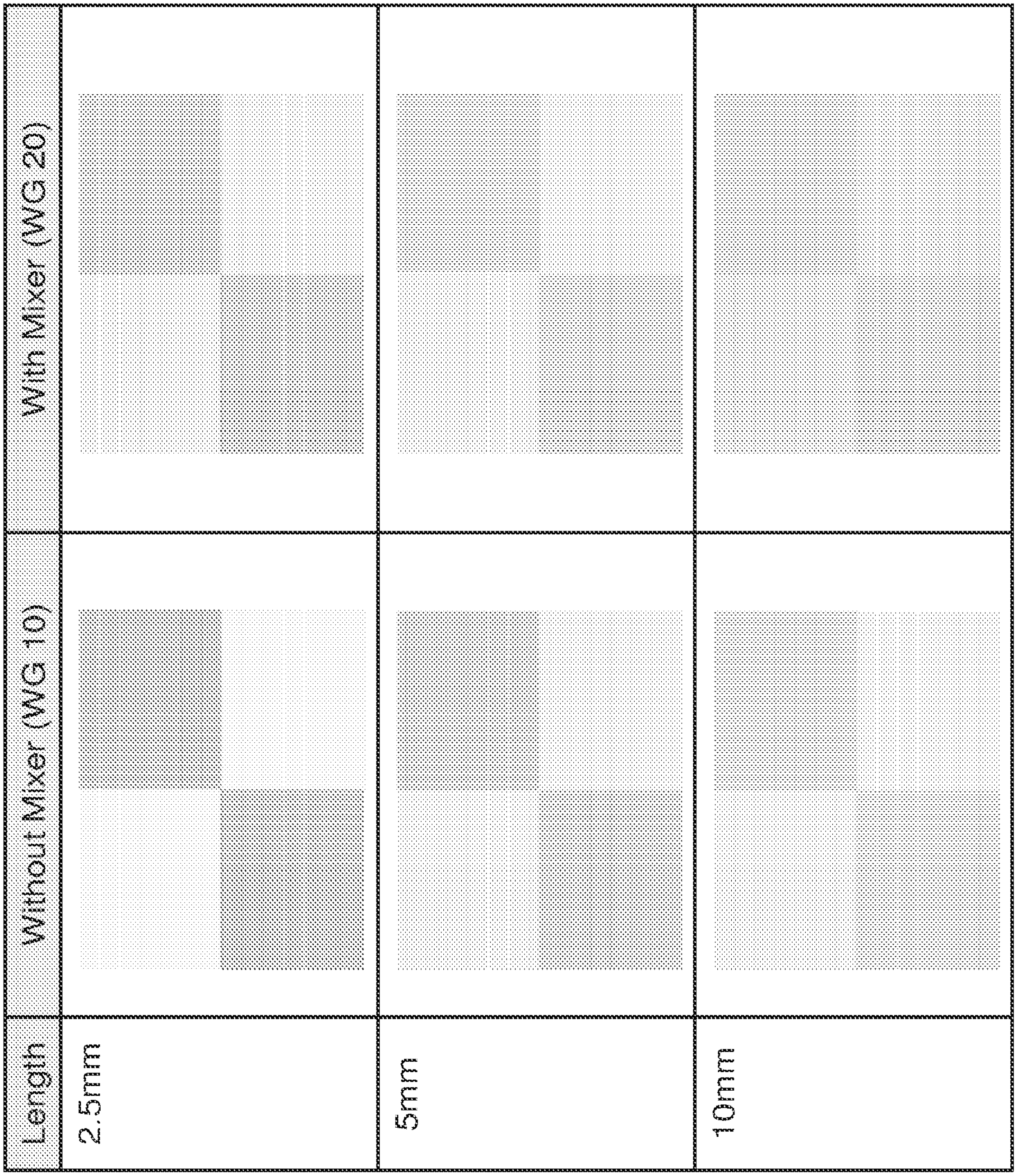
FIG. 2C illustrates a color mixing chart of the waveguide of FIGS. 2A and 2B.

FIG. 2C illustrates color distribution as detected at the end 18 of the waveguide 10 as a function of length of the waveguide 10. For purposes of illustration (absent the ability to reproduce color here), colors are shown as shades of grey. Increased uniformity of color corresponds to increased achromaticity at the end 18 of the waveguide 10 while increased contrast corresponds to increase chromaticity at the end 18.

As can be seen from FIG. 2C, the length of the waveguide 10 along the general direction of light travel plays a role in the color mixing process. The longer waveguide 10 (5 mm) provides more opportunities for the individual colors to interact and mix than the shorter waveguide 10 (2.5 mm), resulting in a more uniform and blended output. The even longer waveguide 10 (10 mm) provides even more opportunities for the individual colors to interact and mix than the shorter waveguide 10 (2.5 mm and 5 mm), resulting in a more uniform and blended output.

FIG. 2B illustrates an exemplary waveguide 20 which is similar to the waveguide 10 except it includes an inner partially reflecting surface or interface 25 extending along the length (the general direction of light travel) of the waveguide 20. In the illustrated embodiment of FIG. 2B, interface 25 is placed as a plane diagonal to the square cross-section (the cross-section perpendicular to the length)

of waveguide 20. In the illustrated embodiment, interface 25 is disposed diagonally transversing the two G (green) LEDs.

The surface 25 may be coated with a partially reflective coating. The present embodiment assumes a reflective coating such that, for all wavelengths and all angles, the surface 25 reflects 50% of light incident thereon. By way of example, this could be achieved by forming the waveguide 20 using two prisms, each having a triangular cross-section and the length of the waveguide 20. The interface surface of one or both prisms may be coated with a partially reflective coating. The two prisms may then be glued together such that the interface between the two prisms corresponds to the inner partially reflective surface 25.

FIG. 2C illustrates color distribution as detected at the end 18 of waveguide 20 including the inner partially reflecting surface 25 as a function of length of the waveguide 20. As can be seen from FIG. 2C, color mixing is improved from waveguide 10 to waveguide 20 due to the waveguide 20 having the partial reflecting surface 25.

An ideal coating having the same reflectivity for all wavelengths and angles may be difficult to achieve. However, the mixing may also be improved by using a layer of high refractive index glue on the surface 25. This could be achieved, for example, by forming the waveguide 20 using two prisms, each having a triangular cross-section and the length of the waveguide 20, as described above. The two prisms may be glued together using a high refractive index glue such that the interface between the two prisms corresponds to the inner partially reflective surface 25. One example of a high refractive index glue or adhesive is an epoxy-based adhesive that contains high refractive index particles or additives. These additives are typically fine particles of materials with a high refractive index, such as titanium dioxide (TiO2) or barium titanate (BaTiO3). When mixed with the epoxy adhesive, they increase its refractive index to be higher than the refractive index of the prism's surface.

While FIG. 2B discloses the partial reflecting surface 25 positioned along the diagonal of the squared cross-section of the waveguide 20, other embodiments with different geometries of surfaces and cross-section may also be considered. For example, similar results may be achieved for a tapered waveguide in which the face of the exit end 18 has a different size cross-section than that of the entrance end 16.

Figure 3B:
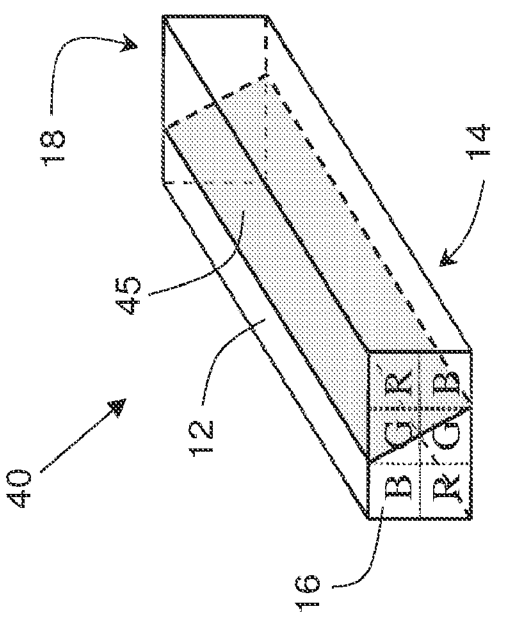
FIG. 3B illustrates an exemplary waveguide that includes an inner partially reflecting surface or interface extending along the length of the waveguide.
Figure 3A:
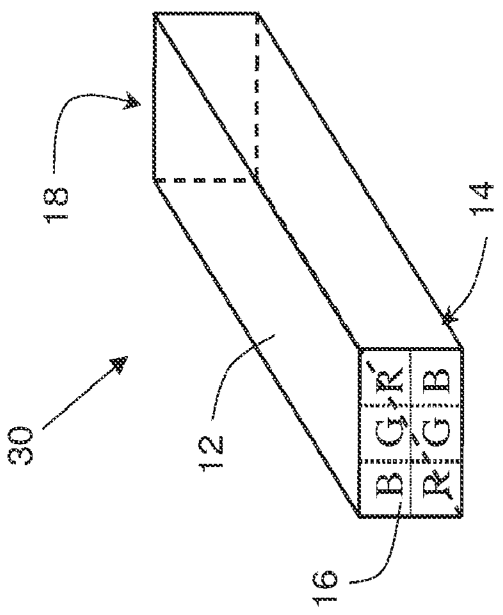
FIG. 3A illustrates a perspective view of a waveguide for the POD of FIG. 2.
Figure 3C:
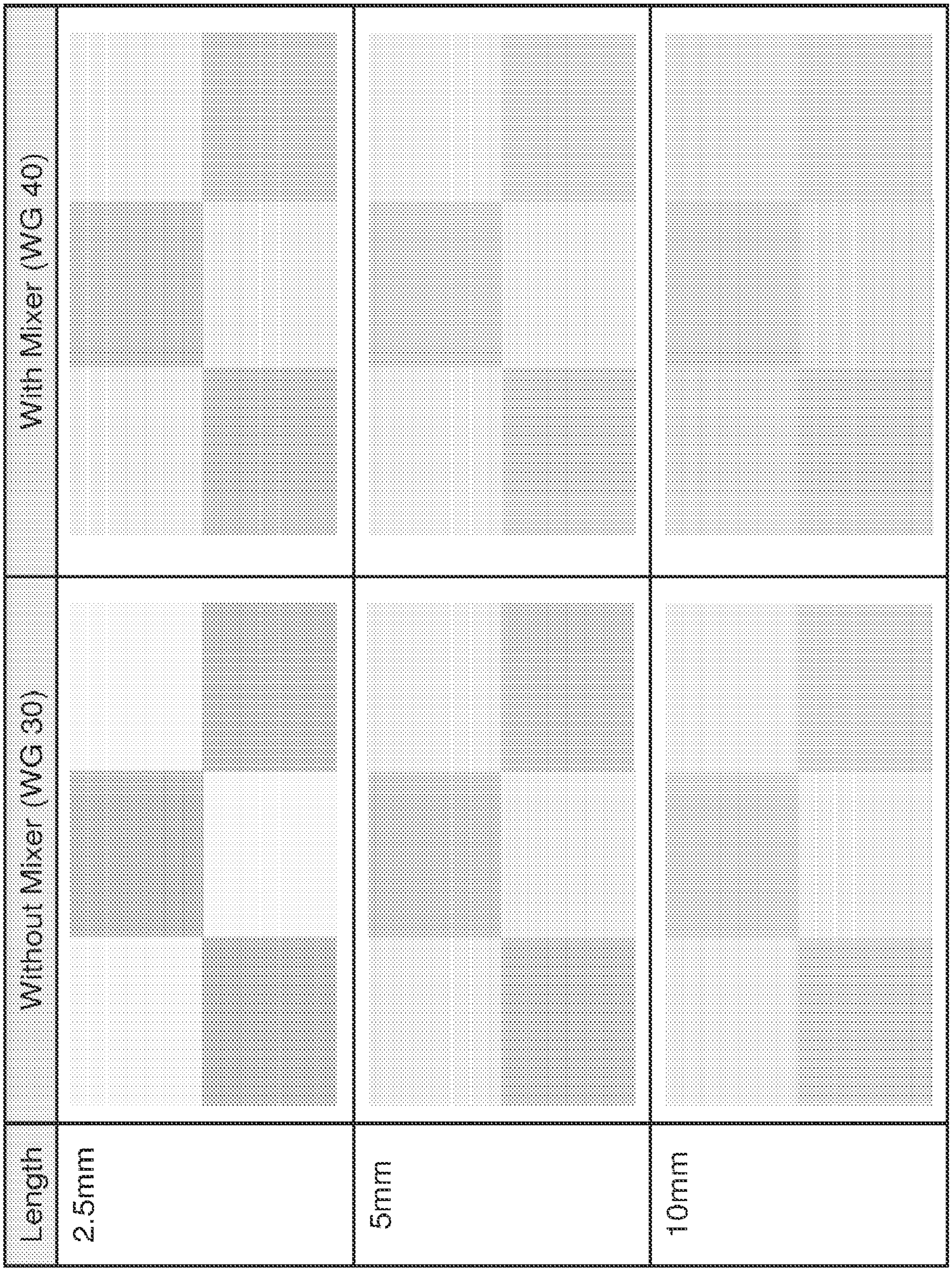
FIG. 3C illustrates a color mixing chart of the waveguide of FIGS. 3A and 3B.

FIGS. 3A, 3B, and 3C illustrate a similar configuration except the waveguide 30 of the POD 130 has a rectangular cross-section. In this embodiment, the discrete light source matrix 132 of the POD 130 contains LEDs in a 3×2 arrangement of BGR:RGB format as shown in FIGS. 3A. The crossection is 3×2mm as an example. In FIG. 3B, the waveguide 40 includes a partial reflecting surface 45 (similar to surface 25) disposed along the diagonal of the center G LEDs. The inner surface 45 divides the rectangular cross-section into two equal trapezoids. FIG. 3C illustrates the effect of the inner partial reflecting surface 45. As may be seen from FIG. 3C, color mixing improves with the length of the waveguides 30, 40 and, importantly, color mixing improves with the inclusion of the inner partial reflecting surface 45 in the waveguide 40.

Figure 4B:
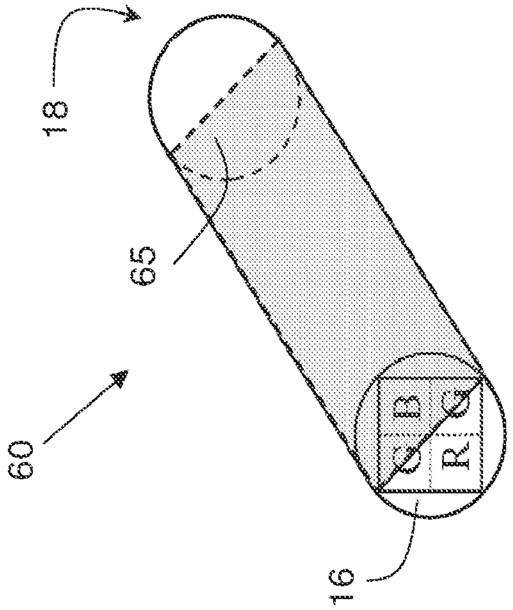
FIGS. 4B illustrates a waveguide with a circular cross-section that includes an inner partially reflecting surface or interface extending along the length of the waveguide.
Figure 4A:
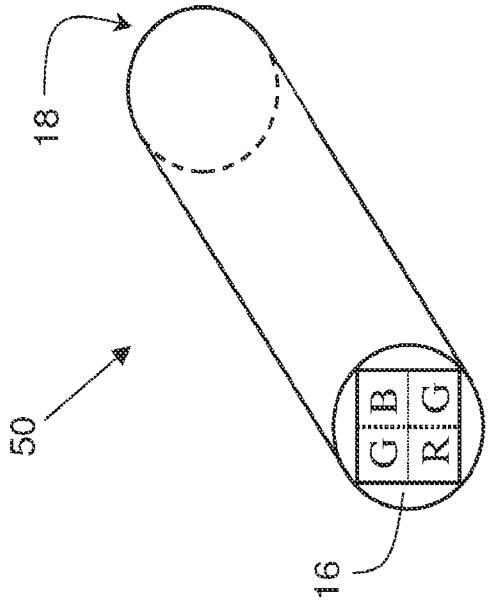
FIGS. 4A illustrates a waveguide with a circular cross-section.

FIGS. 4A and 4B illustrate similar principles applied to a waveguide with a circular cross-section to improve the color mixing. While square and rectangular cross-section waveguides are more commonly used, circular waveguides have their own applications and advantages in certain scenarios.

Figure 4C:
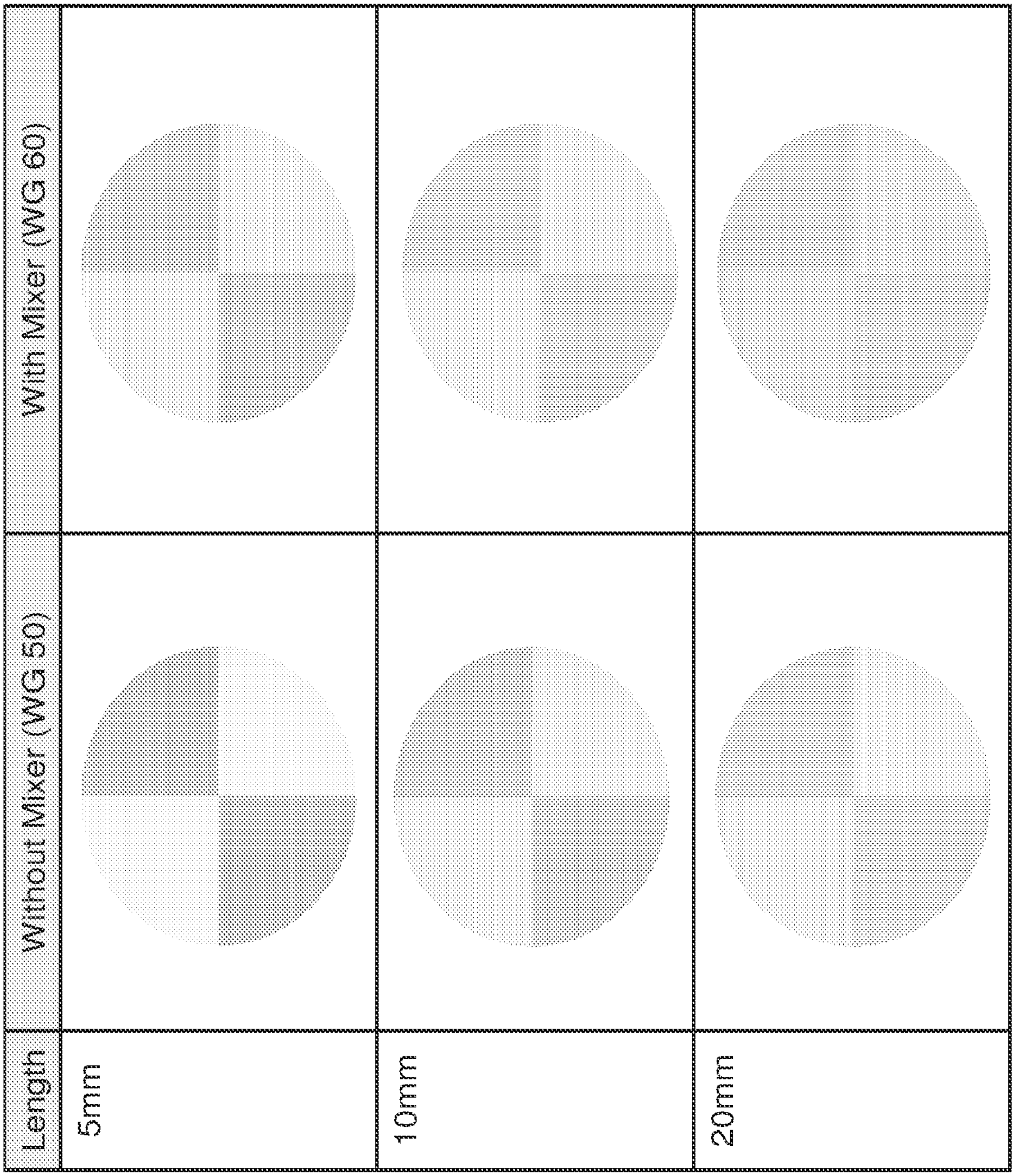
FIG. 4C illustrates a color mixing chart of the waveguide of FIGS. 4A and 4B.

In FIGS. 4A and 4B the discrete light source matrix 132 in the form of a quad array of LED is introduced to shine light on the input surface 16 of the waveguide 50, a circular cross-section waveguide. The circular cross-section may be set such that the circle will exactly incircle the quad array. For instance, if the square side measures 1 mm, the circle diameter Φ equals $\sqrt{2}$A=1.412 mm. For waveguide 60, a partially reflecting surface 65 is introduced, dividing the GB:RG array at the Gs to two sets of 3 LEDs. Here we again assume that the coating reflects 50% of the light for all angles and wavelengths. As may be seen from FIG. 4C, color mixing improves with the length of the waveguides 50, 60 and, importantly, color mixing improves with the inclusion of the inner partial reflecting surface 65 in the waveguide 60.

Besides the partial reflecting surface described above, partial lenses may be used to improve the color mixing performance of the POD 130. The partial lenses correspond to less than the whole coupling-in interface 16 or input surface of the waveguide. For example, the partial lenses may correspond to 25% to 75% of the area of the coupling-in interface 16.

Figure 5A:
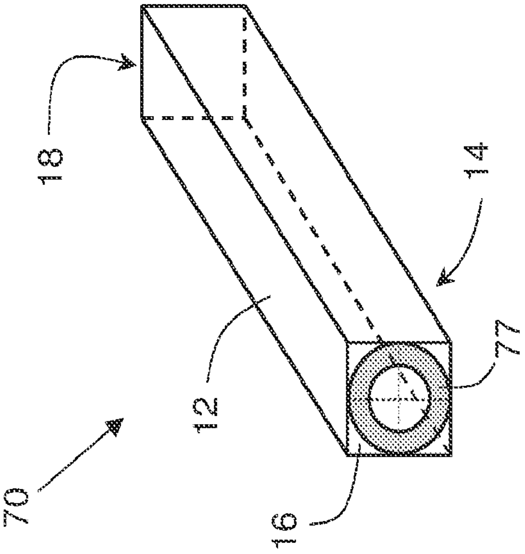
FIG. 5A illustrates a waveguide having a similar configuration to the waveguide of FIG. 2A including a partial lens at the coupling-in interface.

FIG. 5A illustrates a waveguide 70 having a similar configuration to waveguide 10 of FIG. 2A except waveguide 70 includes a partial lens 77 at the coupling-in interface 16, the light entrance of the waveguide 70. In the illustrated embodiment of FIG. 5A, the discrete light source matrix 132 of FIG. 2 corresponds to a quad 2×2 LED array. Light from the discrete light source matrix 132 is introduced into the waveguide 70 through the coupling-in interface 16 resulting in a coupling-in pattern in the order GB:RG (first row: Green, Blue; Second row: Red, Green) as in FIG. 2A. However, the embodiment of FIG. 5A includes the partial lens 77.

In the illustrated embodiment, lens 77 has an annulus cross-section overlaying 50% of the area of the coupling-in interface 16 of the waveguide 70. The outer circle has the same diameter as the width/height of the coupling-in interface 16 (width/height of the quad LED array) and the inner circle (where there is no lens 77) has a diameter of about 0.6 of the entire width/height. Hence, the lens 77 covers 50% of the area of the coupling-in interface 16.

Figure 5B:
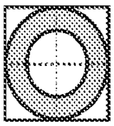
FIGS. 5B to 5D illustrate partial lenses for a square cross-section waveguide.
Figure 5C:
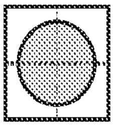
Figure 5D:
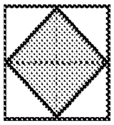

Lens 77 splits the light shined by the discrete light source matrix 132 in a way such that 50% of the light will be refracted by the lens to be centered in a position opposite to the light not refracted by the lens and, thus, the mixing improves. Such a 50% split can be achieved by a lens with an annulus cross-section as shown in FIG. 5B, by a lens with the cross-section overlapping the inner circle (with 50% of area) as shown by the partially filled area of FIG. 5C, or by a partially filled square as shown in FIG. 5D.

Figure 5E:
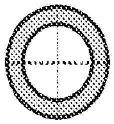
FIGS. 5E and 5F illustrate partial lenses for a cylindrical waveguide.
Figure 5F:
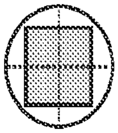

FIG. 5E illustrates an annular 50% partial lens and FIG. 5F illustrates a square 50% partial lens for a cylindrical waveguide. These partial lenses may be partially cylindrical lenses with their flat surface disposed against the coupling-in interface 16 of the waveguide.

Figure 5G:
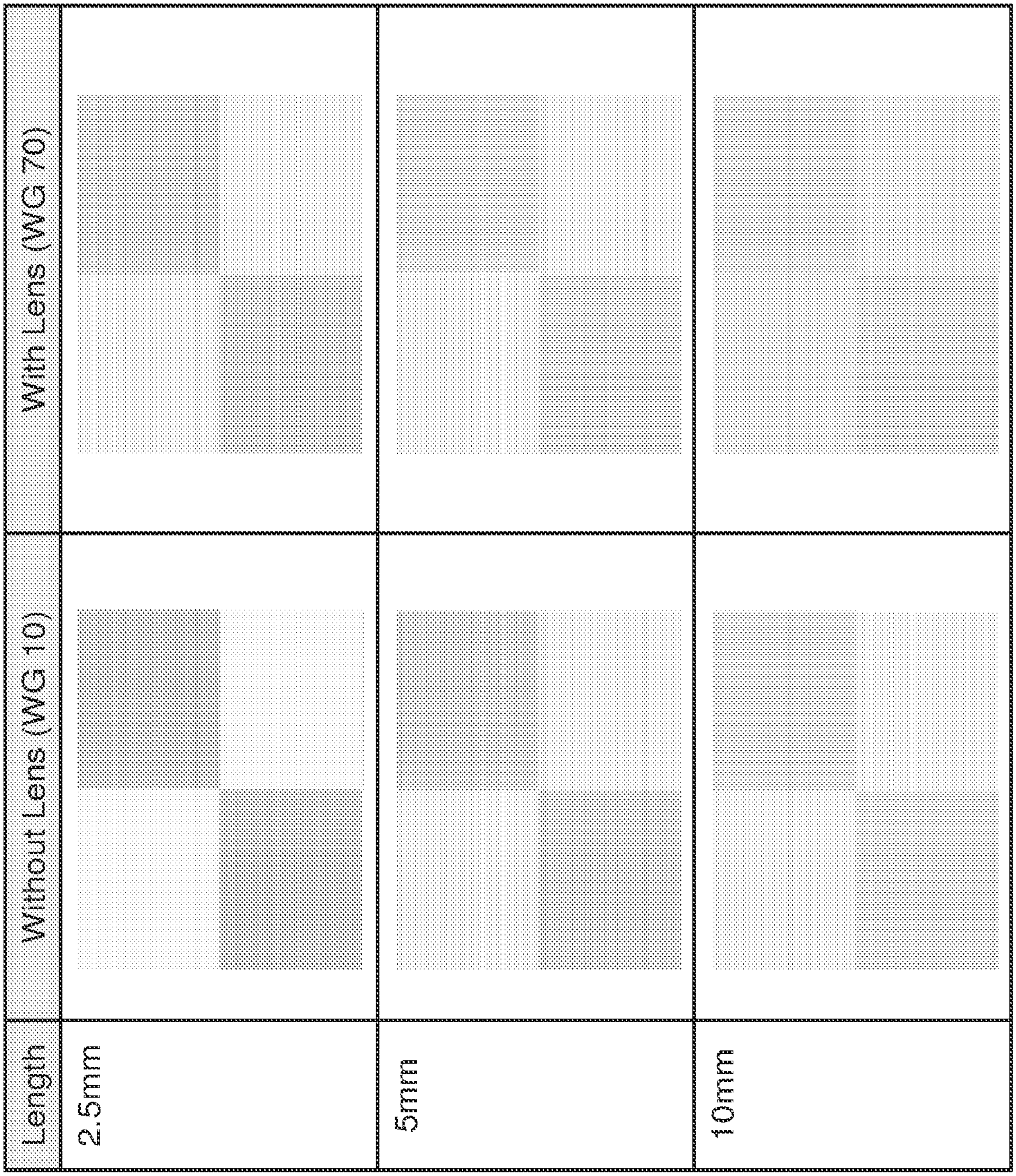
FIG. 5G illustrates a color mixing chart of the waveguide of FIG. 5A.

Using a partial lens contributes to the color mixing in a similar manner to the inner partial surface, as described above. FIG. 5G illustrates color distribution as detected at the end 18 of the waveguide 70 including the partial lens 77 as a function of length of the waveguide 70 compared to the waveguide 10. As can be seen from FIG. 5G, color mixing is improved from waveguide 10 to waveguide 70 due to the waveguide 70 having the partial lens 77.

Figure 6A:
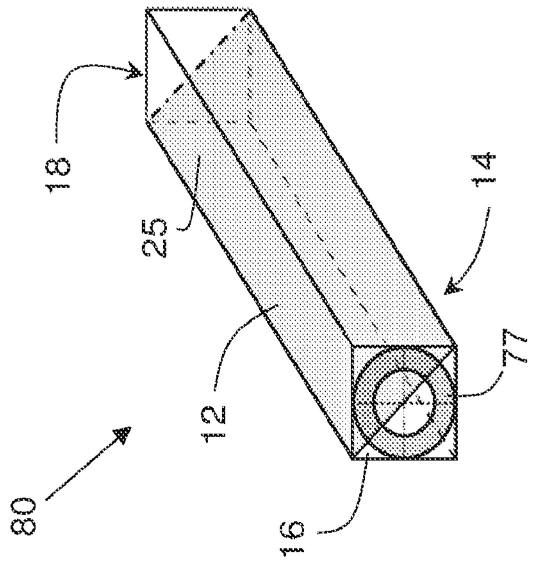
FIG. 6A illustrates a waveguide having both a partial lens at the coupling-in interface and a partial reflecting surface along the waveguide.
Figure 6B:
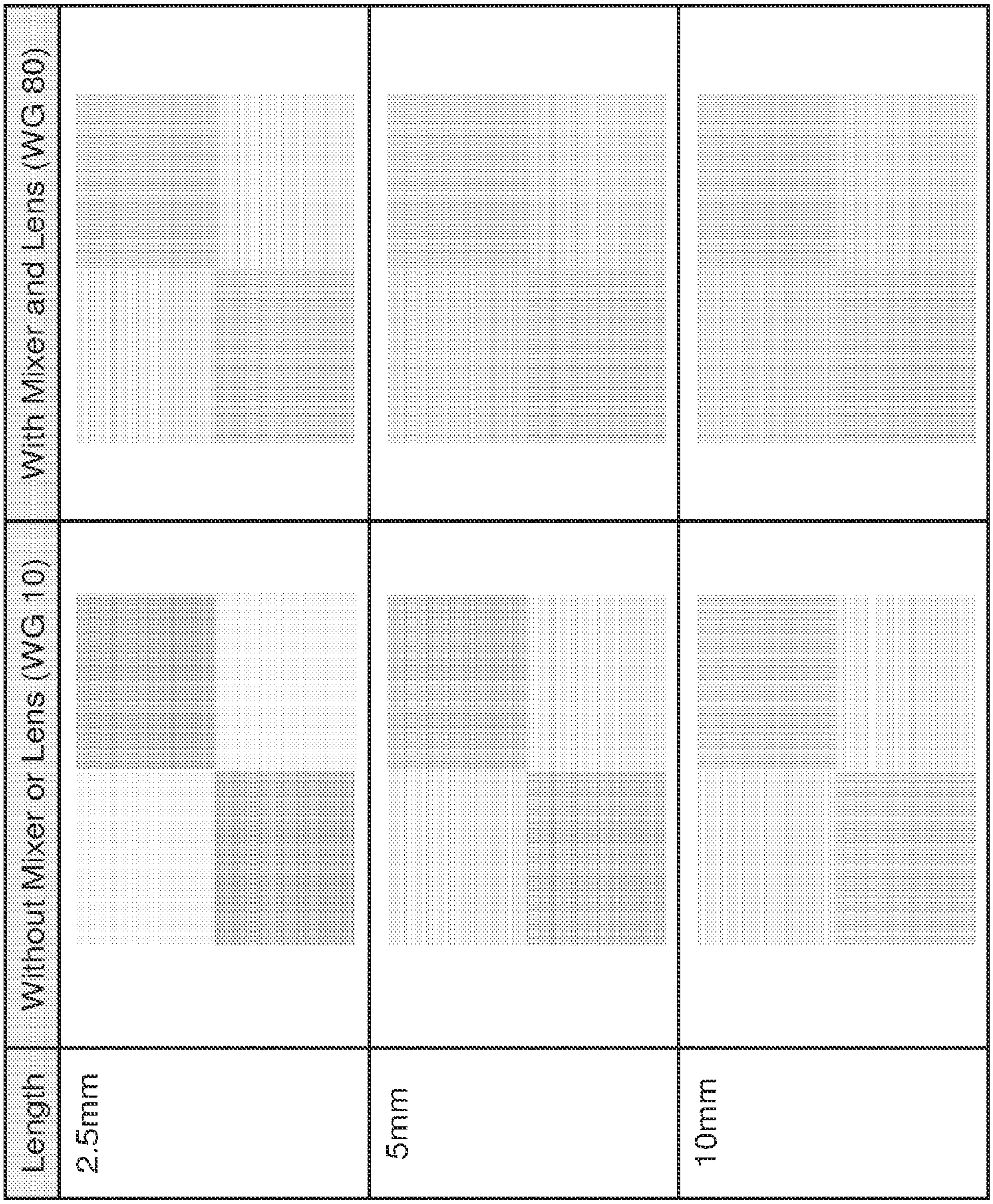
FIG. 6B illustrates a color mixing chart of the waveguide of FIG. 6A.

FIG. 6A illustrates a waveguide 80 having both the partial lens 77 at the coupling-in interface 16 and a partial reflecting surface 25 along the waveguide 80. The color mixing results are shown in FIG. 6B. FIG. 6B shows the color distribution without mixing by either partial lens or partially reflecting surface (waveguide 10) compared to the color distribution with an inner surface 25 of high index of refraction (e.g., 1.7; Abbe=30) and a 50% partial lens 77 (waveguide 80). As seen in FIG. 6B, the result over the comparable length (e.g., 10 mm) is almost ideally uniform, which corresponds to almost perfect white.

Figure 7A:
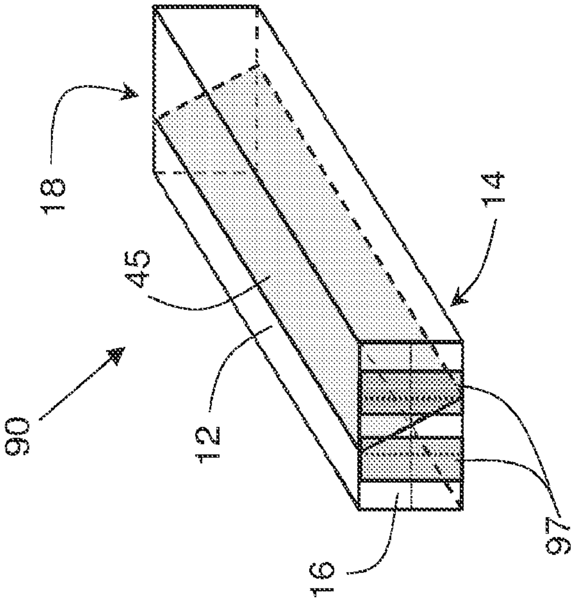
FIG. 7A illustrates a rectangular waveguide having both partial lenses at the coupling-in interface and a partial reflecting surface along the waveguide.

FIG. 7A illustrates the rectangular waveguide 90 of FIG. 2 having both partial lenses 97 at the coupling-in interface 16 and a partial reflecting surface 45 along the waveguide 90. Following the same logic for a hex LED array 132 of 3×2 RGB:BGR array, a set of two cylindrical lenses 97 could be introduced on half of the LEDs area (the area of the coupling-in interface 16). They are positioned so that they overlap half of the BR and RB LEDs and a quarter of the GG LEDs. The lenses 97 may be semi-cylindrical with power along the horizontal direction refracting the GG LEDs light towards the RB LEDs and vice versa. Using a semi-cylindrical lens and not a semi-spherical lens may have a better mixing effect. However, a semi-spherical lens should also be considered as it may also yield improvements from the prior art. The exact focal length of the lenses 97 may need to change with the exact length of the waveguide 90. The partial cylindrical lenses 97 could be introduced in front of the waveguide 90 together with the inner partial reflecting surface 45 as shown in FIG. 7A.

Figure 7B:
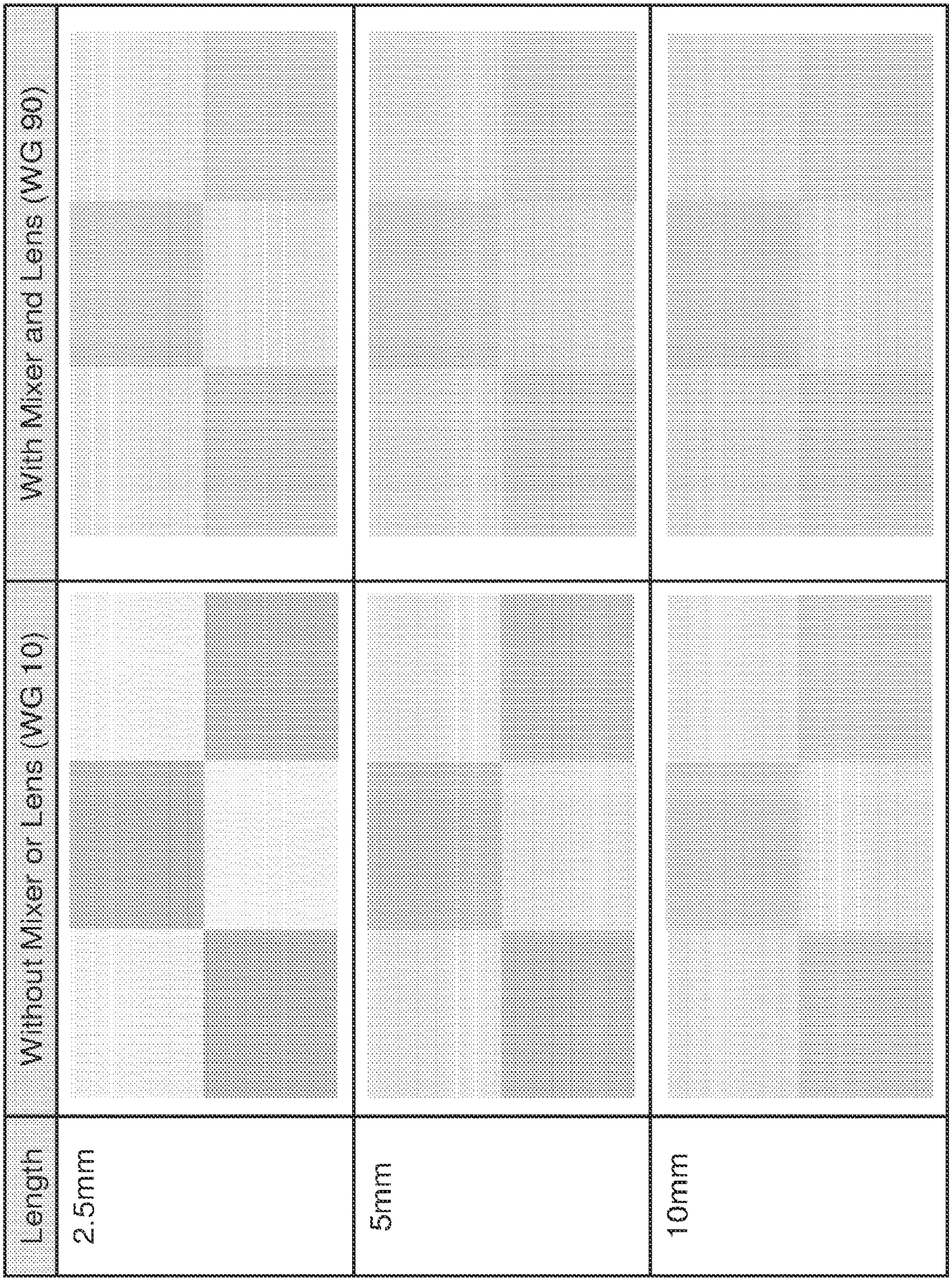
FIG. 7B illustrates a color mixing chart of the waveguide of FIG. 7A.

The color mixing results are shown in FIG. 7B. FIG. 7B shows the color distribution without mixing by either partial lens or partially reflecting surface (waveguide 10) compared to the color distribution with an inner surface 45 of high index of refraction (e.g., 1.7; Abbe=30) and 50% partial lenses 97 (radius of curvature of 1.5 mm, zero conic constant and sizes of H=1 mm and W=0.375 mm) (waveguide 90). As seen in FIG. 7B, the result over the comparable length (e.g., 10 mm) is almost ideally uniform, which corresponds to almost perfect white.

Figure 8:
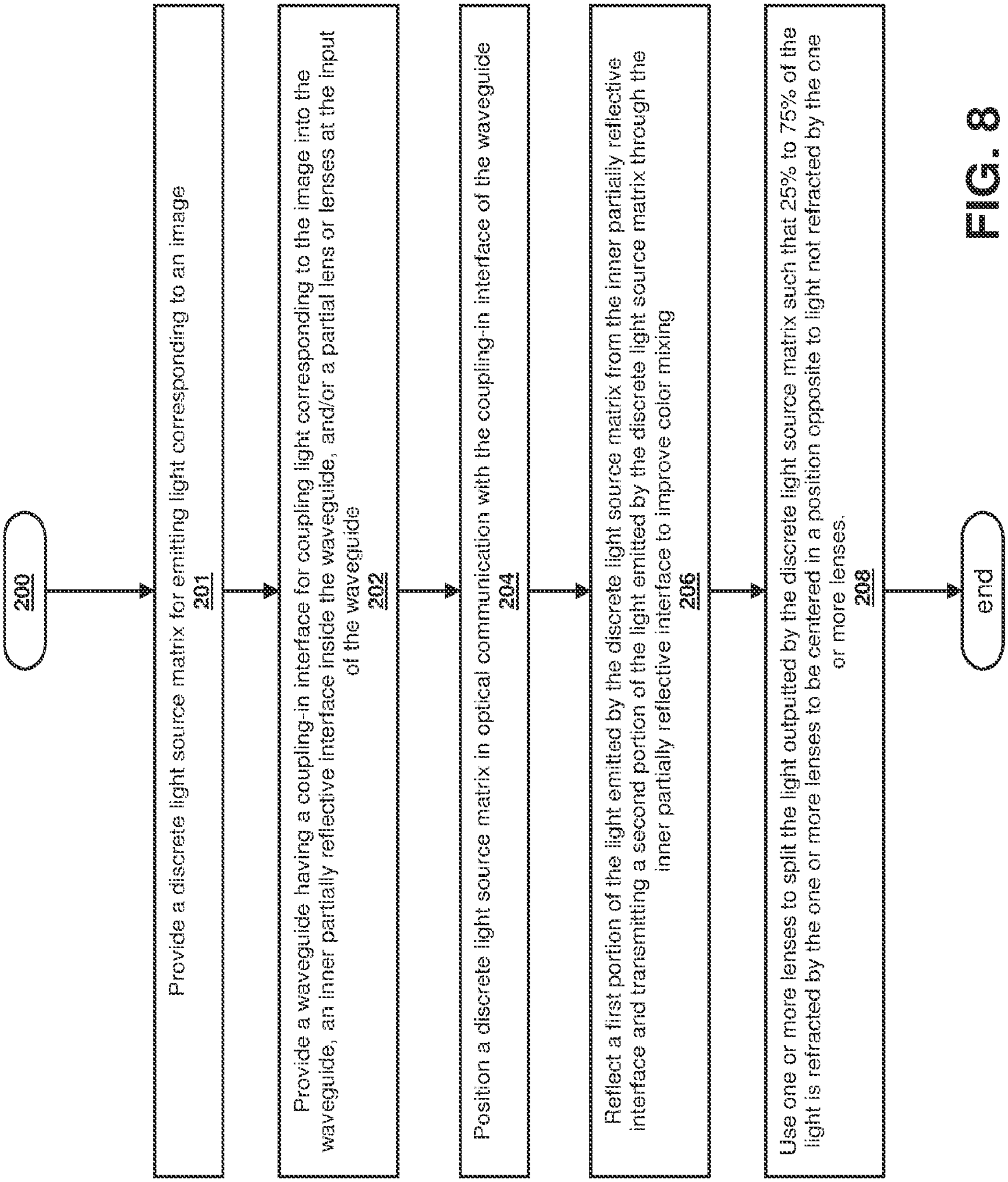
FIG. 8 illustrates a flow diagram for an exemplary method for uniformity enhancement of a color mixing waveguide.

Exemplary methods may be better appreciated with reference to the flow diagram of FIG. 8. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrate functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

FIG. 8 illustrates a flow diagram for an exemplary method 200. As shown in FIG. 8, process 200 may include providing a discrete light source matrix for emitting light corresponding to an image (block 201). The process 200 may also include providing a waveguide having a coupling-in interface for coupling light corresponding to the image into the waveguide, an inner partially reflective interface inside the waveguide, or a partial lens or lenses at the input of the waveguide (block 202). As also shown in FIG. 8, process 200 may include positioning a discrete light source matrix in optical communication with the coupling-in interface of the waveguide (block 204).

As further shown in FIG. 8, in a first embodiment, the process 200 may include reflecting a first portion of the light emitted by the discrete light source matrix from the inner partially reflective interface and transmitting a second portion of the light emitted by the discrete light source matrix through the inner partially reflective interface to improve color mixing (block 206).

In a second embodiment, alone or in combination with the first embodiment, process 200 includes using the one or more lenses to split the light outputted by the discrete light source matrix such that 25% to 75% of the light is refracted by the one or more lenses to be centered in a position opposite to light not refracted by the one or more lenses (block 208).

In a third embodiment, alone or in combination with the first or second embodiment, the discrete light source matrix part of a projector selected from the group having of a Digital Light Processing (DLP) projector, an LCD or an LCoS (Liquid Crystal on Silicon) projector, and an LED array.

In a fourth embodiment, alone or in combination with one or more of the first through third embodiments, the inner partially reflective interface is coated with a partially reflective coating and/or includes a high refractive index glue.

In a fifth embodiment, alone or in combination with one or more of the first through fourth embodiments, the waveguide is cylindrical with a circular cross-section and the inner partially reflective interface is positioned to divide the circular cross-section.

Although FIG. 8 shows example blocks of process 200, in some embodiments, process 200 may include additional blocks, fewer blocks, different blocks, or differently arranged blocks than those depicted in FIG. 8. FIG. 1 illustrates a schematic diagram of an exemplary optical system for a near-eye display (NED). Additionally, or alternatively, two or more of the blocks of process 200 may be performed in parallel.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term “includes” or “including” is employed in the detailed description or the claims, it is intended to be inclusive in a manner similar to the term “comprising” as that term is interpreted when employed as a transitional word in a claim. Furthermore, to the extent that the term “or” is employed in the detailed description or claims (e.g., A or B) it is intended to mean “A or B or both.” When the applicants intend to indicate “only A or B but not both” then the term “only A or B but not both” will be employed. Thus, use of the term “or” herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A light projecting system for uniformity enhancement of color mixing comprising:

a discrete light source matrix for emitting light corresponding to an image;

a waveguide formed from transparent material and having a coupling-in interface for coupling in the light corresponding to the image into the waveguide, and a coupling- out interface for coupling out the image out of the waveguide;

an inner partially reflective surface disposed in the waveguide extending along the length of the waveguide, the inner partially reflective surface positioned diagonally across a cross-section that is perpendicular to the length of the waveguide; and one or more partial lenses disposed between the discrete light source matrix and the coupling-in interface, the one or more partial lenses overlaying only 25% to 75% of an area of the discrete light source matrix or an area of the coupling-in interface.

2. The light projecting system according to claim 1, wherein the inner partially reflective surface is coated with a partially reflective coating or corresponds to a high refractive index material.

3. The light projecting system according to claim 1, wherein the inner partially reflective surface comprises a coated surface with a reflective coating that reflects approximately 50% of the light for all wavelengths and incidence angles.

4. The light projecting system according to claim 1, the waveguide comprising two prisms each having a triangular cross-section, the two prisms glued together, an interface between the two prisms corresponding to the inner partially reflective surface.

5. The light projecting system according to claim 1, the light projecting system corresponding to a projector selected from the group consisting of a Digital Light Processing (DLP) projector, an LCD (Liquid Crystal Display) an LCOS (Liquid Crystal on Silicon) projector, and an array of LED.

6. A light projecting system for uniformity enhancement of color mixing comprising:

a discrete light source matrix for emitting light corresponding to an image;

a waveguide formed from transparent material and having a coupling-in interface for coupling in the light corresponding to the image into the waveguide, and a coupling-out interface for coupling the image out of the waveguide; and an inner partially reflective surface disposed in the waveguide extending along the length of the waveguide, the inner partially reflective surface positioned diagonally across a cross-section that is perpendicular to the length of the waveguide.

7. The light projecting system according to claim 6, wherein the inner partially reflective surface is coated with a partially reflective coating or corresponds to a high refractive index material.

8. The light projecting system according to claim 6, wherein the inner partially reflective surface comprises a coated surface with a reflective coating that reflects approximately 50% of the light for all wavelengths and angles.

9. The light projecting system according to claim 6, the waveguide comprising two prisms each having a triangular cross-section, the two prisms glued together, an interface between the two prisms corresponding to the inner partially reflective surface.

10. The light projecting system according to claim 6, wherein the waveguide is tapered with varying size cross-section and the inner partially reflective surface is positioned diagonally.

11. A light projecting system for uniformity enhancement of color mixing comprising:

a discrete light source matrix for emitting light corresponding to an image;

a waveguide formed from transparent material and having a coupling-in interface for coupling in the light corresponding to the image into the waveguide, and a coupling-out interface for coupling out the image out of the waveguide; and one or more partial lenses disposed between the discrete light source matrix and the coupling-in interface, the one or more partial lenses overlaying 25% to 75% of a) an area of the coupling-in interface or b) an output area of the discrete light source matrix, wherein the one or more partial lenses are configured such that a first portion of light emitted by the discrete light source matrix passes through the one or more partial lenses and a second portion of the light enters the waveguide without passing through the one or more partial lenses, wherein the one or more partial lenses redirect the first portion of light into the waveguide at different angles than the second portion of light to enhance color mixing within the waveguide.

12. The light projecting system according to claim 11, wherein the waveguide is cylindrical with a circular cross-section and the inner partially reflective surface is positioned to divide the circular cross-section.

13. The light projecting system according to claim 11, wherein the waveguide is cylindrical and the one or more partial lenses have an annulus cross-section.

14. The light projecting system according to claim 11, the discrete light source matrix corresponding to a projector selected from the group consisting of a Digital Light Processing (DLP) projector, an LCD an LCOS (Liquid Crystal on Silicon) projector, and an array of LED.

15. A method for enhancing color uniformity of a compact light projector comprising:

providing a discrete light source matrix for emitting light corresponding to an image;

providing a waveguide with a rectangular or circular cross-section, the waveguide having a coupling-in interface for coupling light corresponding to the image into the waveguide and an inner partially reflective interface inside the waveguide, the inner partially reflective surface disposed in the waveguide extending along the length of the waveguide, the inner partially reflective surface positioned diagonally across a cross-section that is perpendicular to the length of the waveguide;

positioning the discrete light source matrix in optical communication with the coupling-in interface of the waveguide; and reflecting a first portion of the light emitted by the discrete light source matrix from the inner partially reflective interface and transmitting a second portion of the light emitted by the discrete light source matrix through the inner partially reflective interface to improve color mixing of an output of the compact light projector.

16. The method according to claim 15, comprising:

using one or more lenses to split the light outputted by the discrete light source matrix such that 50% of the light is refracted by the one or more lenses to be centered in a position opposite to light not refracted by the one or more lenses.

17. The method according to claim 15, wherein the compact light projector is selected from the group consisting of a Digital Light Processing (DLP) projector, an LCD, an LCOS (Liquid Crystal on Silicon) projector, and an LED array.

18. The method according to claim 15, wherein the inner partially reflective interface is coated with a partially reflective coating and/or includes a high refractive index glue.

19. The method according to claim 15, wherein the waveguide is cylindrical with a circular cross-section and the inner partially reflective interface is positioned to divide the circular cross-section.

* * * * *